(12) United States Patent
Hsia

(10) Patent No.: US 12,034,639 B2
(45) Date of Patent: Jul. 9, 2024

(54) SYSTEMS AND METHODS FOR EFFICIENT AND SCALABLE ROUTING FOR CONTAINERIZED SERVICES

(71) Applicant: Verizon Patent and Licensing Inc., Basking Ridge, NJ (US)

(72) Inventor: Andrew Hsia, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 25 days.

(21) Appl. No.: 17/814,077

(22) Filed: Jul. 21, 2022

(65) Prior Publication Data
US 2024/0031284 A1    Jan. 25, 2024

(51) Int. Cl.
*H04L 45/745*    (2022.01)
*H04L 45/586*    (2022.01)
*H04L 61/4511*    (2022.01)

(52) U.S. Cl.
CPC .......... *H04L 45/745* (2013.01); *H04L 45/586* (2013.01); *H04L 61/4511* (2022.05)

(58) Field of Classification Search
CPC ... H04L 45/745; H04L 61/4511; H04L 45/586
USPC ........................................................ 709/238
See application file for complete search history.

(56) References Cited

U.S. PATENT DOCUMENTS

| | | | | |
|---|---|---|---|---|
| 2017/0012943 | A1* | 1/2017 | Kaliski, Jr. | H04L 61/4552 |
| 2017/0244787 | A1* | 8/2017 | Rangasamy | H04L 43/0817 |
| 2018/0159929 | A1* | 6/2018 | Heckle | H04L 67/1095 |
| 2020/0099610 | A1* | 3/2020 | Heron | H04L 61/256 |
| 2020/0150992 | A1* | 5/2020 | Stanley | G06F 9/45558 |
| 2020/0358858 | A1* | 11/2020 | Shribman | G06F 16/9566 |
| 2021/0289385 | A1* | 9/2021 | Roessler | H04L 41/0893 |

FOREIGN PATENT DOCUMENTS

| | | | | |
|---|---|---|---|---|
| WO | WO-2020231952 A1 * | 11/2020 | | G06F 8/63 |
| WO | WO-2021029910 A1 * | 2/2021 | | H04L 41/0895 |

OTHER PUBLICATIONS

Protected Coordination of Service Mesh for Container-Based 3-Tier Service Traffic Moonjoong Kang; Jun-Sik Shin; JongWon Kim 2019 International Conference on Information Networking (ICOIN) Year: 2019 | Conference Paper | Publisher: IEEE (Year: 2019).*

(Continued)

*Primary Examiner* — Philip C Lee

(57) ABSTRACT

A system described herein may identify that a first container and a second container of a virtualized environment are instantiated at a particular node that is associated with a particular address (e.g., an Internet Protocol ("IP") address). The system may identify a logical association between the first and second containers, such as a logical and/or hierarchical association specified by a custom resource definition. The system may generate a first Domain Name System ("DNS") record (e.g., an "A" record) associating the first container with the address of the particular node, and may a second DNS record (e.g., a "CNAME" record) associating the second container with the first container. The system may provide the first and second DNS records to a DNS server, which may provide the address of the particular node when receiving a DNS request specifying the second container.

20 Claims, 12 Drawing Sheets

(56) References Cited

OTHER PUBLICATIONS

Docker for Multi-containers Web Application 2020 2nd International Conference on Innovative Mechanisms for Industry Applications (ICIMIA) (pp. 589-592) Vivek Sharma · Harsh Kumar Saxena · Akhilesh Kumar Singh (Year: 2020).*

Kubernetes, Cluster Architecture, available at https://kubernetes.io/docs/concepts/architecture/ (Jun. 16, 2021).

Kubernetes, Containers, available at https://kubernetes.io/docs/concepts/containers/ (Sep. 10, 2020).

Enns et al., Network Configuration Protocol (NetConf), IETF RFC 6241, available at https://www.rfc-editor.org/rfc/pdfrfc/rfc6241.txt.pdf (Jun. 2011).

NetConf, NetConf User Guide, available at https://docs.opendaylight.org/projects/netconf/en/latest/user-guide.html (visited Jun. 21, 2022).

P. Mockapetris, Domain Names—Implementation and Specification, Network Working Group RFC 1035, available at https://www.rfc-editor.org/rfc/pdfrfc/rfc1035.txt.pdf (Nov. 1987).

Hamilton et al., Use of DNS Aliases for Network Services, Network Working Group RFC 2219, available at https://www.rfc-editor.org/rfc/pdfrfc/rfc2219.txt.pdf (Oct. 1997).

* cited by examiner

SYSTEMS AND METHODS FOR EFFICIENT AND SCALABLE ROUTING FOR CONTAINERIZED SERVICES

BACKGROUND

Wireless networks or other systems may make use of virtualized environments, which may include nodes that are implemented by virtual machines, cloud systems, bare metal devices, etc. Containerized processes, or containers, may be instantiated on the nodes. In the context of a software-defined network ("SDN"), the containers may implement one or more network functions of the SDN.

DETAILED DESCRIPTION OF EXAMPLE EMBODIMENTS

The following detailed description refers to the accompanying drawings. The same reference numbers in different drawings may identify the same or similar elements.

Embodiments described herein provide for efficient scaling and routing of a virtualized environment. For example, a virtualized environment may include nodes that include, and/or that are implemented by, virtual machines, cloud systems, bare metal hardware, or the like, as well as containers, images, etc. that are instantiated on the nodes. The nodes and containers may both be associated with addresses, names, identifiers, locators, etc. (e.g., Internet Protocol ("IP") addresses, Fully Qualified Domain Names ("FQDNs"), logical names, Uniform Resource Locators ("URLs"), etc.). Embodiments described herein may utilize DNS techniques in order to quickly and efficiently route traffic to and/or from containers and/or nodes of the virtualized environment, which may result in faster performance, reduced maintenance overhead, as well as reduced resources compared to, for example, a lookup table that stores information mapping logical names or FQDNs to IP addresses. Further, leveraging existing DNS techniques provides for improved scalability, risk of faulty code, and reduced development efforts compared to implementing a lookup table that stores information mapping logical names or FQDNs to IP addresses. As discussed below, for example, some embodiments may translate, port, etc. configuration parameters of the virtualized environment (e.g., custom resource definitions of a virtualized environment implemented using the open source Kubernetes application programming interface ("API") or some other configuration parameters of a suitable type of virtualized environment) to one or more DNS records (e.g., A records and/or CNAME records) to provide for the use of DNS techniques to provide efficient routing in a virtualized environment.

Figure 1:
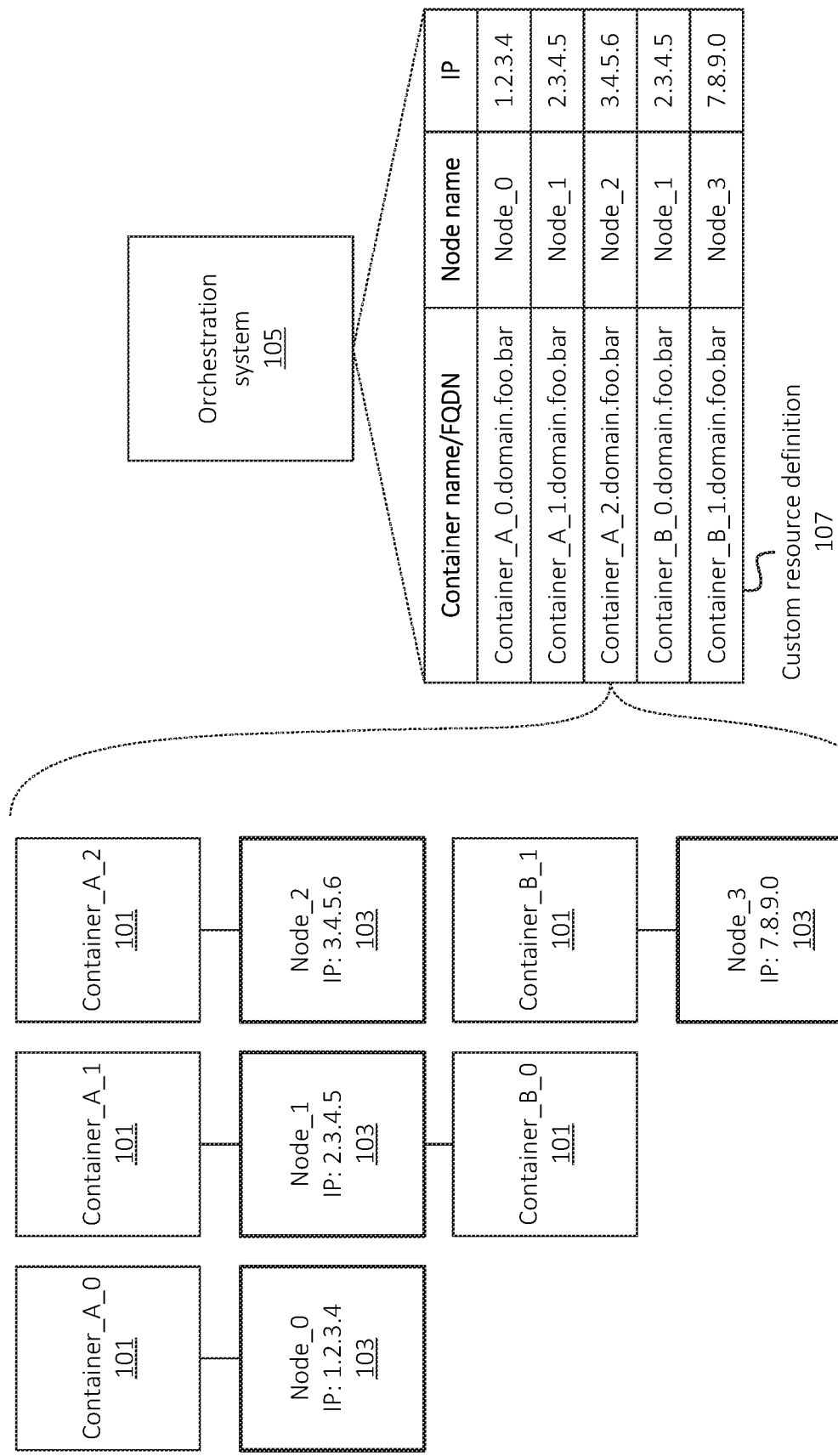
FIG. 1 illustrates an example data structure, associated with a virtualized environment, indicating a set of containers that are instantiated at a set of nodes, in accordance with some embodiments.

As shown in FIG. 1, for example, a set of containers 101 may be instantiated, installed, etc. on respective nodes 103. As noted above, each container 101 may be an instance, image, copy, etc. of a given type, class, category, etc. of container. In the following description, the following naming convention is used to indicate instances and/or types of containers 101. "Container_i_j" refers to the j-th instance of a container of type i. For example, Container_A_1 and Container_A_2, in FIG. 1, are two separate instances of the same type of container (e.g., container type "A"). As noted above, nodes 103 may represent hardware resources, such as virtual machines, bare metal devices, etc. on which respective containers 101 are instantiated, installed, etc. For example, nodes 103 may include and/or may be implemented by server devices, datacenters, cloud systems, etc.

In some embodiments, containers 101 may implement controllers, network functions, etc. associated with a SDN. For example, containers 101 may implement, include, etc. Virtualized Network Functions ("VNFs") of a wireless network, such as User Plane Functions ("UPFs"), Session Management Functions ("SMFs"), Access and Mobility Management Functions ("AMFs"), Unified Data Management functions ("UDMs"), etc. In some embodiments, containers 101 may implement, include, etc. network controllers that control other containers 101. For example, a particular type of container 101 may include an SDN controller that manages, provides configuration instructions to, etc. other containers 101.

One example type of SDN controller may be implemented using the open source OpenDaylight ("ODL") API. In some embodiments, some VNFs, as implemented by one or more containers 101, may be implemented using the Internet Engineering Task Force ("IETF") Network Configuration ("NETCONF") protocol. In practice, other types of protocols, APIs, etc. may be implemented by containers 101. Further, in practice, containers 101 may be used for other purposes in addition to, or in lieu of, implementing an SDN.

As noted above, containers 101 and nodes 103 may be part of a virtualized environment, which may be managed by Orchestration system 105. Orchestration system 105 may, for example, serve as an interface via which containers 101 and nodes 103 may be configured, installed, modified, etc. In some embodiments, Orchestration system 105 may be an orchestration system provided via the open source Kubernetes API or some other suitable type of virtualized environment orchestration and/or management platform.

Orchestration system 105 may maintain custom resource definition 107 and/or some other suitable type of data structure, indicating the configuration of the virtualized environment. For example, as shown, custom resource definition 107 may include an addressable name and/or FQDN associated with each container 101, as well as one or more indications of respective nodes 103 on which each container 101 is installed. In some embodiments, custom resource definitions 107 may include other suitable information, configuration parameters, etc. associated with each container 101. For the sake of explanation, such other information is not described herein.

As shown, custom resource definition 107 may indicate that Container_A_0 (e.g., associated with the FQDN Container_A_0.domain.foo.bar) is associated with (e.g., installed on) Node_0, which has the IP address of 1.2.3.4. In some embodiments, Orchestration system 105 may also maintain a respective set of custom resource definitions or other suitable information indicating the respective locator information (e.g., IP addresses) for each node 103. In some embodiments, custom resource definition 107 may be generated by Orchestration system 105 based on instructions, commands, configuration parameters, etc. provided via one or more APIs, portals, and/or other suitable communication pathways associated with Orchestration system 105. Additionally, or alternatively, custom resource definition 107 may itself be provided via such communication pathways. In some embodiments, for example, Orchestration system 105 may receive an instruction to instantiate a particular instance of a given type of container 101, and may select a particular node 103 on which to instantiate such container 101 (e.g., based on respective measures of load and/or performance associated with nodes 103 and/or based on one or more other factors). Additionally, or alternatively, Orchestration system 105 may receive an instruction to instantiate a particular container 101 on a particular node 103. In some embodiments, as discussed below, Orchestration system 105 may receive an instruction to mount a given container 101 to another container 101 (or type of container 101) that is already instantiated on a given node 103. For example, the already instantiated container 101 may include a controller, such as an ODL instance or some other type of SDN controller, and the container 101 to mount may include a NETCONF instance or other type of VNF instance. "Mounting" one container 101 to another container 101 may refer to a logical and/or hierarchical association between such containers 101. In some embodiments, mounting may also indicate that such containers 101 are instantiated on the same node 103. For example, assume that a first container 101 is mounted to a second container 101. In some embodiments, the mounting of the first container 101 to the second container may indicate that the first and second containers are instantiated on the same node 103. The mounting may further indicate a hierarchical association between the first and second nodes 103, such as an association in which the second container 101 may receive communications, configuration parameters, etc. associated with the first container 101 (which is mounted to the second container 101), and may forward such communications to the first container 101, may implement or initiate configuration parameter modifications of the first container 101 based on the communications, and/or may perform other operations with respect to the communications associated with the first container 101.

Figure 2:
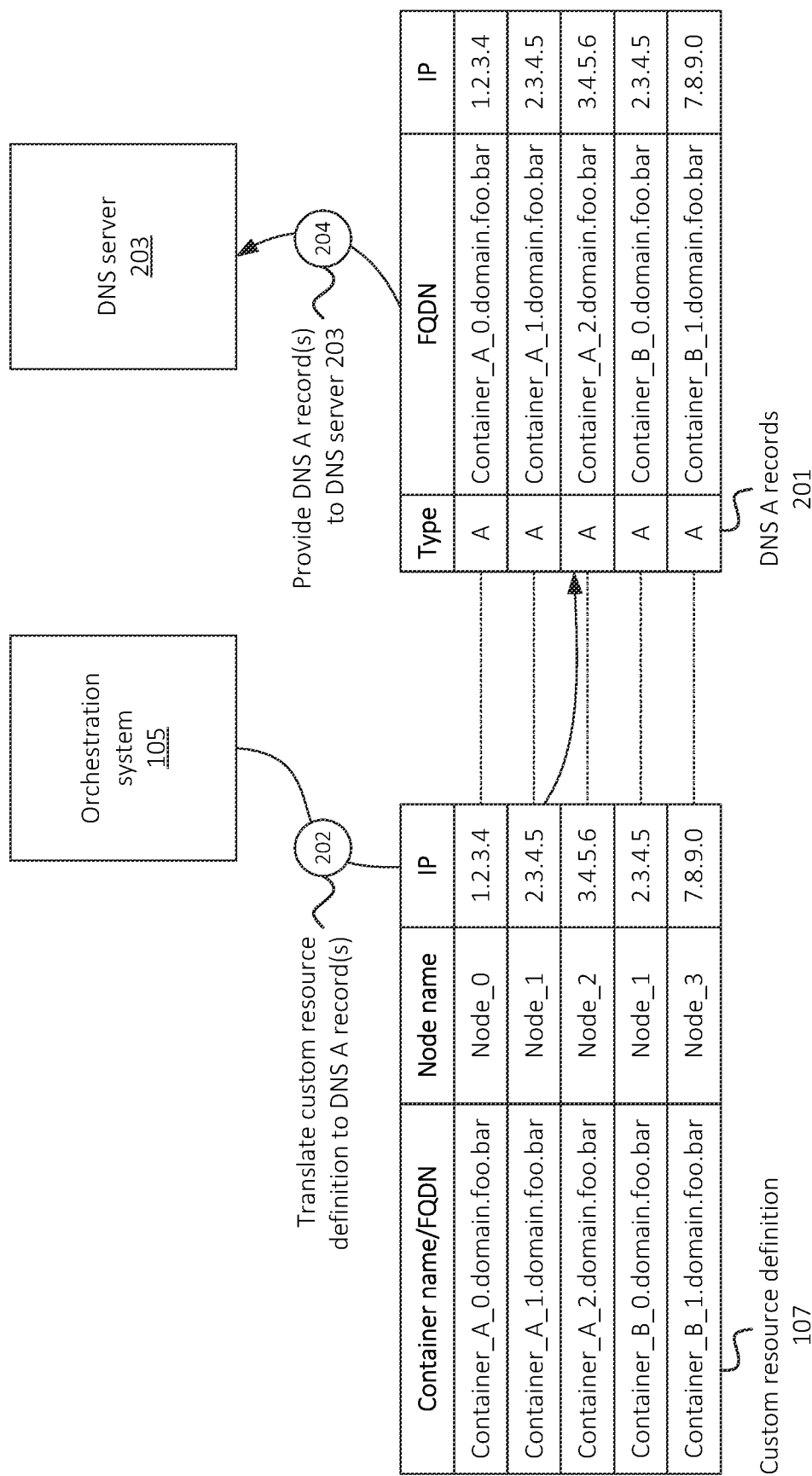
FIG. 2 illustrates an example translation of a data structure, associated with the virtualized environment, to one or more Domain Name System ("DNS") "A" records, in accordance with some embodiments.

In accordance with some embodiments, as shown in FIG. 2, Orchestration system 105 may translate (at 202) some or all of custom resource definition 107 into a set of DNS records (e.g., DNS "A" records 201). In some embodiments, for each container 101 indicated in custom resource definition 107, Orchestration system 105 may generate a respective DNS "A" record 201. The "A" record may associate each respective container 101 with the address, locator, etc. (e.g., IP address) of the respective node 103 on which container 101 is installed. As noted above, the IP address of the respective nodes 103 on which each container 101 is installed is included in custom resource definition 107 of each respective container 101.

As shown, for example, the DNS "A" record for Container_A_0 (e.g., having the FQDN "Container_A_0.domain.foo.bar") may include the IP address 1.2.3.4, which is the IP address of Node_0 on which Container_A_0 is instantiated. Additionally, the DNS "A" record for Container_A_1 may include the IP address 2.3.4.5, which the IP address of Node_1 on which Container_A_1 is instantiated. Similarly, the DNS "A" record for Container_B_0 may also include the IP address 2.3.4.5, as Container_B_0 is also instantiated on Node_1. Orchestration system 105 may further provide (at 204) DNS "A" records 201 to DNS server 203, which may be associated with one or more networks and/or routing topologies of the virtualized environment (e.g., may be associated with one or more routers, switches, etc. that provide routing for containers 101 and/or nodes 103).

In some embodiments, some or all of the operations described as being performed by Orchestration system 105 may be performed by some other device or system. For example, some other device or system may receive custom resource definition 107 from Orchestration system 105 and/or from some other source, and may translate (at 202) custom resource definition 107 into DNS "A" records 201 and/or provide (at 204) DNS "A" records 201 to DNS server 203.

Figure 3:
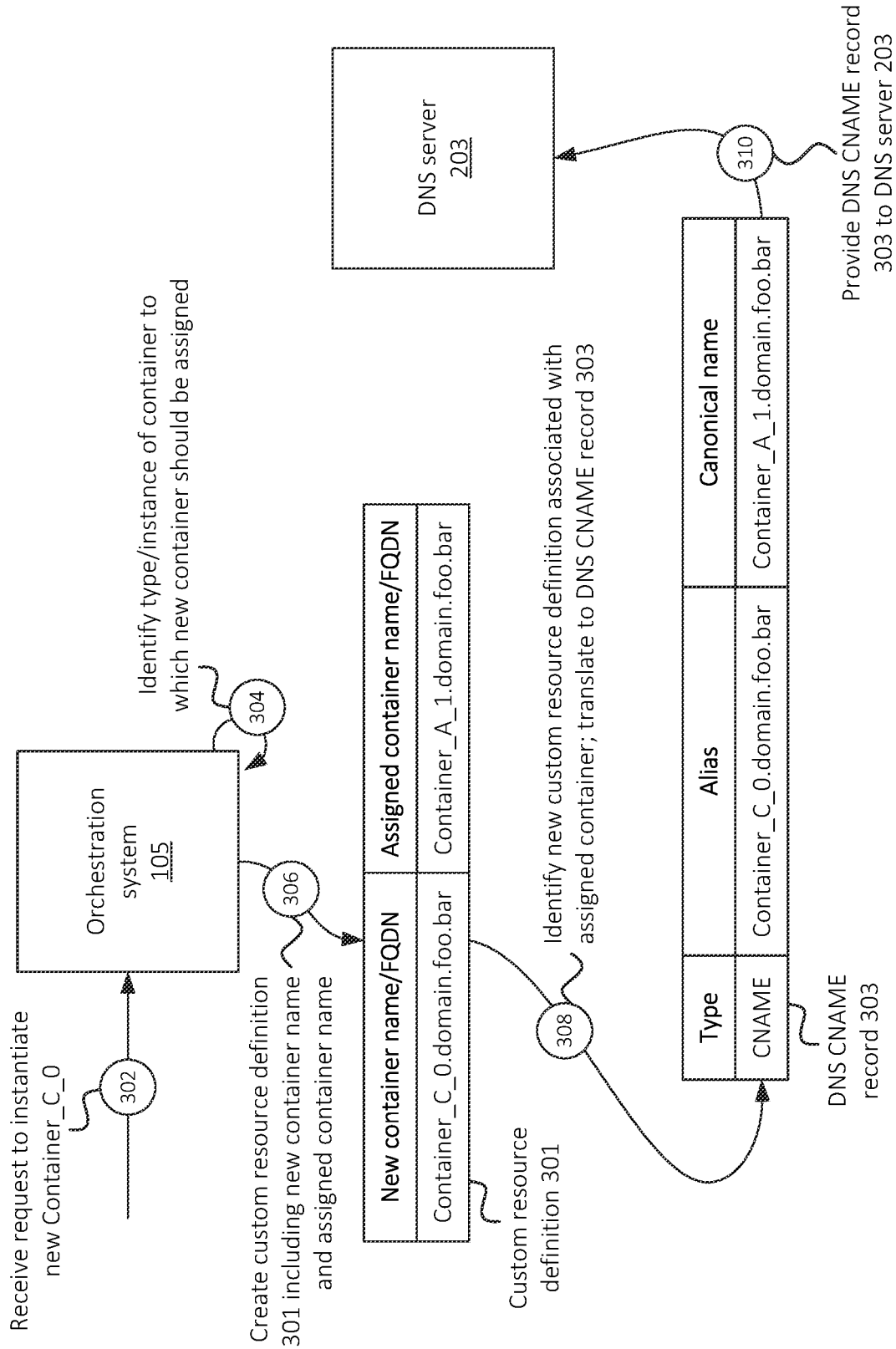
FIG. 3 illustrates an example translation of a data structure, associated with the virtualized environment, to one or more DNS "CNAME" records, in accordance with some embodiments.

As shown in FIG. 3, Orchestration system 105 may receive (at 302) a request, command, instruction, etc. to instantiate a new container 101, of type "C" (e.g., "Container_C_0"). Assume, for example, that the request (at 302) specifies that Container_C_0 should be mounted to, or otherwise associated with, a container 101 of type "A." For example, the type "C" container may be a VNF (e.g., may implement or may otherwise be associated with the NETCONF protocol), and the type "A" container may be a controller (e.g., an ODL instance or other type of SDN controller). Additionally, or alternatively, the request (at 302) may otherwise specify that Container_C_0 should be instantiated on the same node 103 as a container 101 of type "A." In some embodiments, Orchestration system 105 may identify (at 304) that Container_C_0 should be instantiated on the same node 103 as a container 101 of type "A" based on one or more rules, policies, etc. For example, in some situations, the request (at 302) may specify that Container_C_0 should be instantiated on the same node 103 as a container 101 of type "A." In other situations, the request may not include such an indication, in which case Orchestration system 105 may determine that Container_C_0 should be instantiated on the same node 103 as a container 101 of type "A" based on previously received policy information.

Assume that Orchestration system 105 identifies (at 304) that Container_C_0 should be instantiated on the same node 103 as Container_A_1. Orchestration system 105 may create (at 306) custom resource definition 301, which may include a name, FQDN, and/or other identifier of the new container 101 (i.e., Container_C_0) as well as a name, FQDN, etc. of the container 101 (i.e., Container_A_1, in this example) to which the new container 101 should be mounted, and/or should otherwise be instantiated on the same node 103 as. As similarly noted above, custom resource definition 301 may include other suitable information associated with Container_C_0, which is not discussed here for the sake of brevity. In some embodiments, instead of generating (at 306) custom resource definition 301, Orchestration system 105 may receive custom resource definition 301 from some other source, based on which Orchestration system 105 may mount Container_C_0 to Container_A_1. For example, Orchestration system 105 may cause Container_C_0 to be mounted to the same node 103 as Container_A_1, which may include identifying the particular node 103 based on a custom resource definition (or other suitable data structure) associated with Container_A_1.

As further shown, Orchestration system 105 may identify (at 308) that custom resource definition 301 has been received and/or created (at 306), and may translate at least a portion of custom resource definition 301 into DNS "CNAME" record 303. In some embodiments, Orchestration system 105 may identify that DNS "CNAME" record 303 should be generated by one or more tags, flags, etc. in custom resource definition 301. For example, Orchestration system 105 may identify that a "kind" field of custom resource definition 301 includes or matches a particular label, category, tag, etc. The "kind" field may indicate, for example, that Container_C_0 is of a particular type (e.g., type "C," a NETCONF type, a particular type of VNF, etc.). As another example, a "status" or "deviceStatus" field of custom resource definition 301 may indicate a value such as "MOUNTED," indicating that Container_C_0 is mounted to or is otherwise associated with another type of container 101 (i.e., Container_A_1, in this example). Additionally, or alternatively, Orchestration system 105 may identify that custom resource definition 301 matches one or more other policies or criteria, based on which Orchestration system 105 may identify that DNS "CNAME" record 303 should be generated based on custom resource definition 301.

DNS "CNAME" records may, for example, associate an alias with a canonical name. The alias, for example, may include a name, FQDN, etc. that may be used to refer to a given resource, while the canonical name may be a "true" or canonical name, FQDN, of the resource. In some situations, the same canonical name may be mapped to multiple aliases. In accordance with some embodiments, in this example, DNS "CNAME" record 303 may indicate that the FQDN of the newly mounted container 101 (i.e., Container_C_0.domain.foo.bar) is an alias of the container 101 (i.e., Container_A_1.domain.foo.bar) to which Container_C_0 is mounted. For example, as noted above, Orchestration system 105 may identify (e.g., based on custom resource definition 301) that Container_C_0 is mounted to, and/or is otherwise associated with, Container_A_1. Orchestration system 105 may further provide (at 310) the generated DNS "CNAME" record 303 to DNS server 203.

Figure 4:
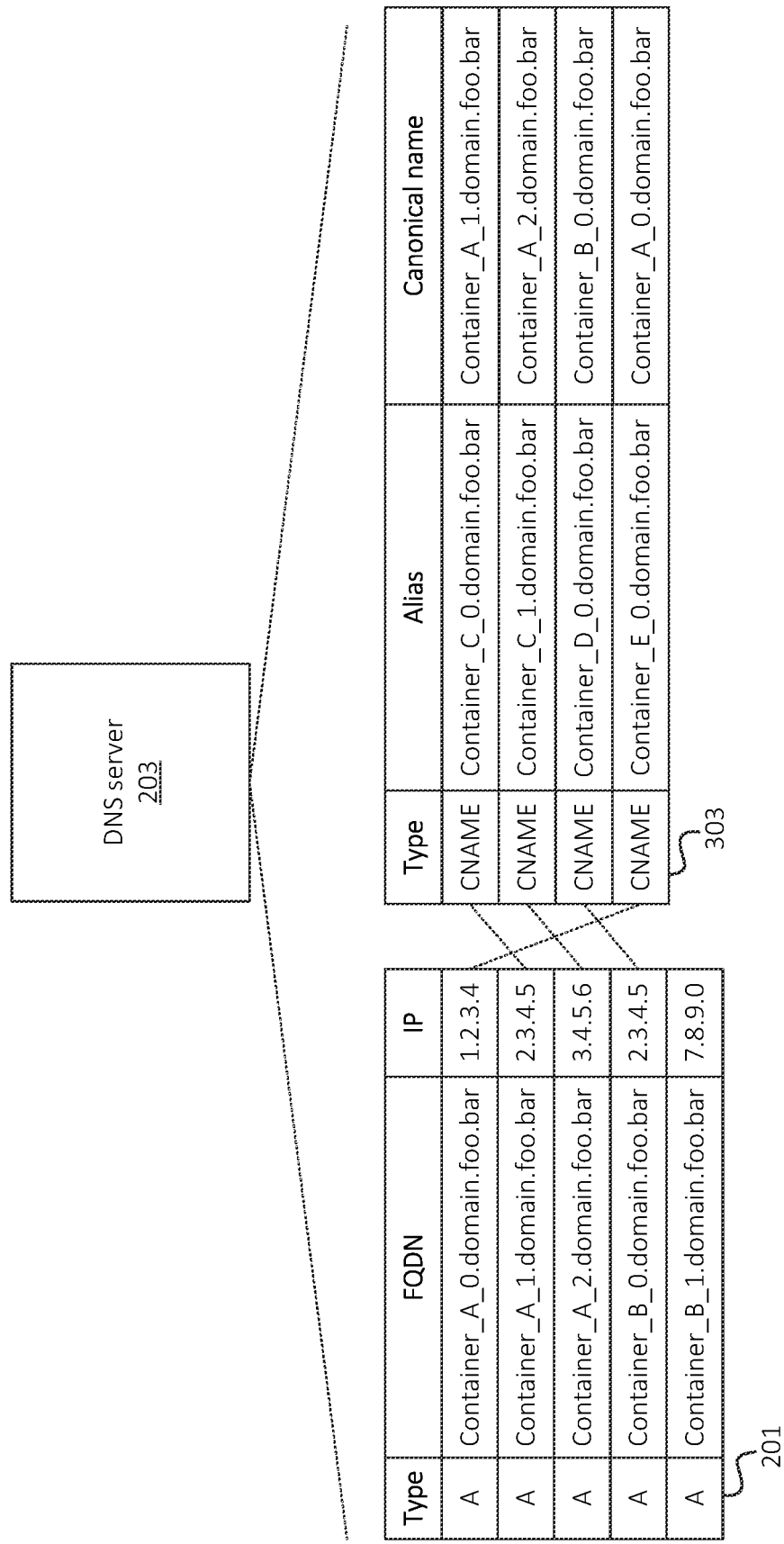
FIG. 4 illustrates an example state of a DNS server after generation of DNS "A" and "CNAME" records based on data structures associated with the virtualized environment, in accordance with some embodiments.

FIG. 4 illustrates an example state of DNS server 203 based on multiple iterations of the procedure shown in FIG. 3, with respect to multiple containers 101 being mounted to existing containers 101. As shown, DNS server 203 may maintain the set of DNS "A" records 201 previously discussed above. DNS server 203 may also include multiple respective DNS "CNAME" records 303, which may be generated based on respective custom resource definitions or other information associating respective containers 101 with each other (e.g., containers 101 that are mounted to other containers 101). As shown, for example, Container_C_1 may be mounted to Container_A_2, and the associated DNS "CNAME" record 303 may indicate that an FQDN, name, etc. of Container_C_1 (i.e., Container_C_1.domain.foo.bar) is an alias of the FQDN, name, etc. of Container_A_2, to which Container_C_1 is mounted. Similarly, DNS "CNAME" records 303 may indicate that Container_D_0.domain.foo.bar is an alias of Container_B_0.domain.foo.bar, and that Container_E_0.domain.foo.bar is an alias of Container_A_0.domain.foo.bar.

Figure 5:
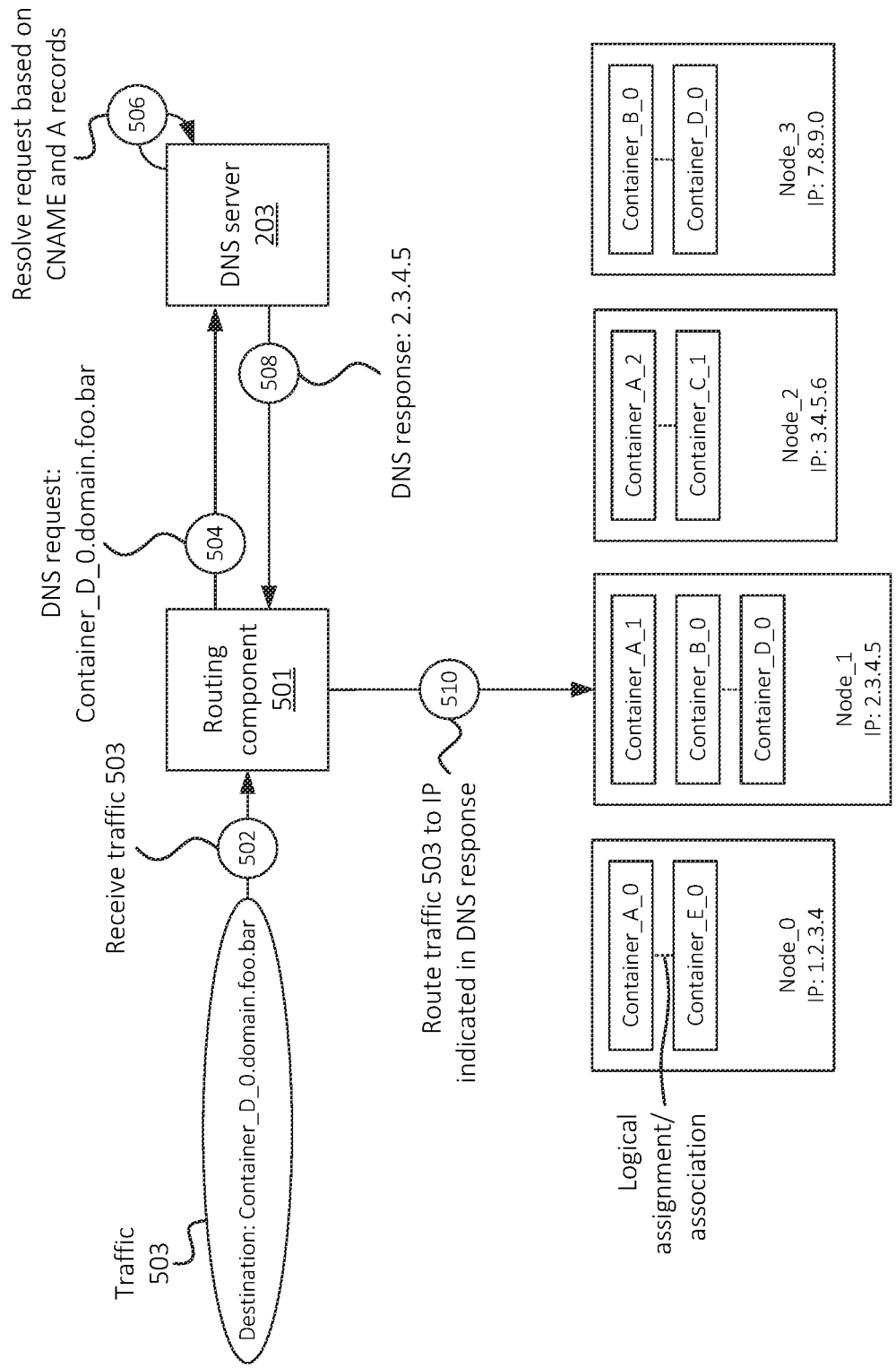
FIG. 5 illustrates example routing of traffic to a particular container that is mounted to another container, based on the generated DNS records, in accordance with some embodiments.

DNS server 203 may use DNS "A" records 201 and DNS "CNAME" records 303 to route traffic (e.g., traffic with a name, FQDN, etc. of a respective container 101, such as a container 101 that is mounted to another container 101) to their appropriate destinations. For example, as shown in FIG. 5, a given routing component 501 (e.g., a router, switch, etc.) that is communicatively coupled to nodes 103 may receive (at 502) traffic 503. In this example, traffic 503 may indicate the FQDN of Container_D_0 (e.g., Container_D_0.domain.foo.bar) as the destination of the traffic. As one example traffic 503 may be or may include user plane traffic sent by or directed to a User Equipment ("UE") connected to a wireless network, and Container_D_0 may be an instance of a UPF of a core of the wireless network.

Routing component 501 may output (at 504) a DNS request to DNS server 203, in order to determine where (e.g., to which IP address) to route traffic 503. DNS server 203 may resolve (at 506) the request based on DNS "A" records 201 and DNS "CNAME" records 303. For example, DNS server 203 may determine that Container_D_0.domain.foo.bar is associated with a particular DNS "CNAME" record 303 (e.g., as shown in FIG. 4) that indicates that Container_D_0.domain.foo.bar is an alias of Container_B_0.domain.foo.bar. DNS server 203 may further determine, based on DNS "A" records 201, that Container_B_0.domain.foo.bar is associated with the IP address 2.3.4.5. Accordingly, DNS server 203 may provide (at 508) a DNS response, indicating that Container_D_0.domain.foo.bar resolves to the IP address 2.3.4.5. Routing component 501 may accordingly route (at 510) traffic 503 to the IP address indicated in the DNS response.

Accordingly, the corresponding node 103 that hosts Container_D_0 (i.e., Node_1, in this example), may receive traffic 503. In some embodiments, a node controller of Node_1 may appropriately route, provide, etc. traffic 503 to Container_D_0 and/or to Container_B_0. For example, based on custom resource definition 301 associated with Container_D_0, the node controller of Node_1 may determine that Container_D_0 is mounted to, and/or is otherwise subordinate to or controlled by, Container_B_0. In such situations, the node controller may provide traffic 503 to Container_B_0, which may perform further processing (e.g., filtering, Quality of Service ("QoS") treatment, etc.) prior to providing traffic 503 to Container_D_0. Additionally, or alternatively, the node controller may provide traffic 503 directly to Container_D_0, and/or may provide a copy of some or all of traffic 503 to both Container_B_0 and Container_D_0.

Figure 6:
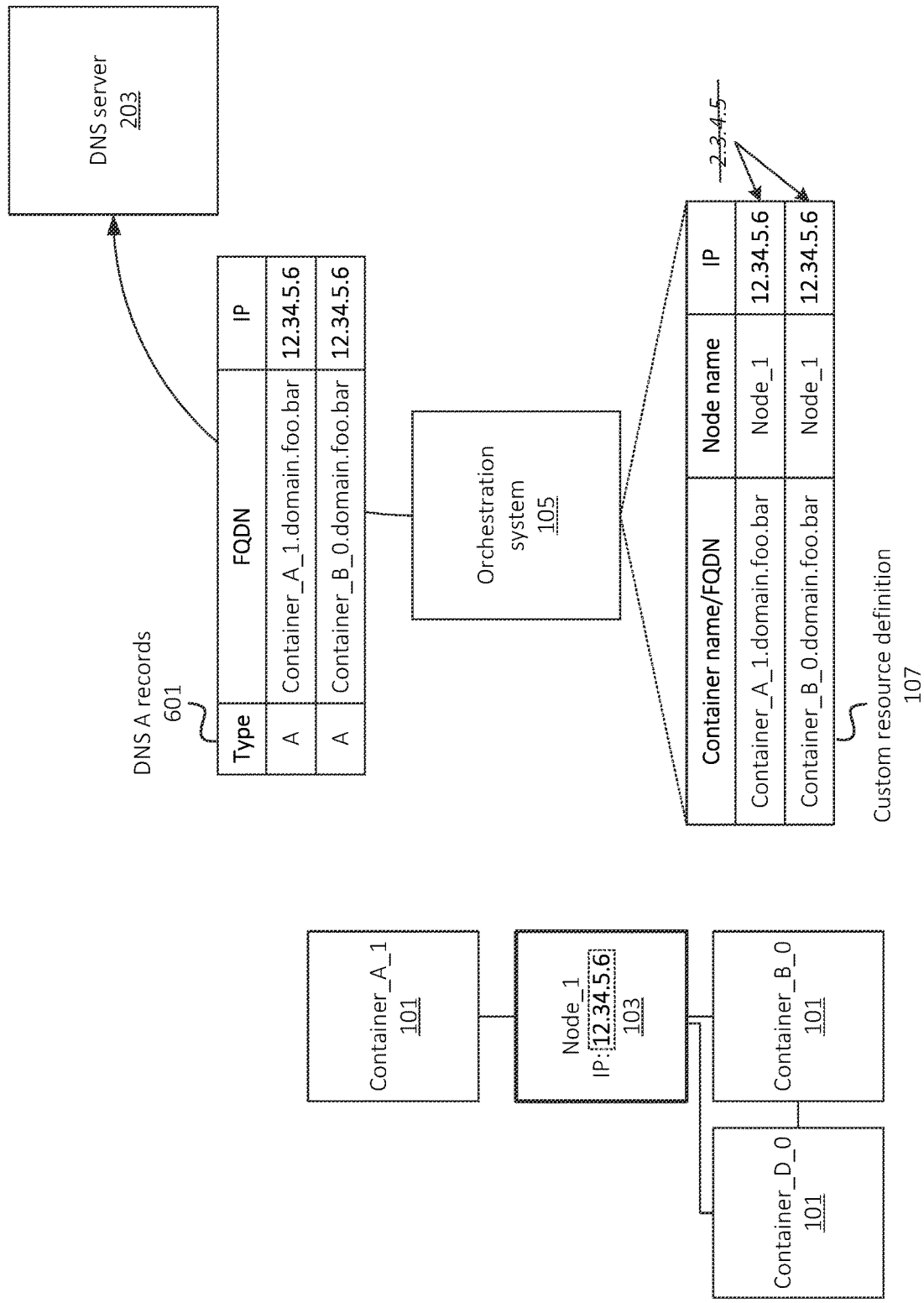
FIGS. 6 and 7 illustrate an example modification to one or more DNS "A" records based on the moving of a set of containers from one node to another, in accordance with some embodiments.

The use of DNS techniques, as discussed above, may further provide for more efficient and robust modifications to the topology and/or addressing of nodes 103. For example, as shown in FIG. 6, Node_1 may be moved to a different IP address (e.g., 12.34.5.6, as opposed to the previous IP address of 2.3.4.5). For example, Node_1 may be failed over to a new set of physical resources if a set of resources, that previously implemented Node_1, has become unreachable, unstable, slow (e.g., if performance has degraded below a threshold measure of performance), etc. Additionally, or alternatively, Node_1 may be moved to a new set of physical resources for some other reason.

Based on the movement of Node_1 to the new set of physical resources (and, resultingly, to a new IP address), Orchestration system 105 may update custom resource definitions 107 associated with Container_A_1 and Container_B_0, as such custom resource definitions 107 may have specified the previous IP address 2.3.4.5. In some embodiments, custom resource definition 301, associated with Container_D_0, may not be updated. For example, as noted above with respect to FIG. 3, custom resource definition 301 may include a reference to Container_B_0. However, in some embodiments, custom resource definition 301 may not include an IP address associated with Container_B_0 and/or of Node_1.

Orchestration system 105 may generate updated DNS "A" records 601 based on the updates to custom resource definitions 107 associated with Container_A_1 and Container_B_0. For example, updated DNS "A" records 601 may include the new IP address 12.34.5.6 for the names and/or FQDNs of Container_A_1 and Container_B_0. Orchestration system 105 may provide updated DNS "A" records 601 to DNS server 203, which may overwrite previous DNS "A" records 201 that were previously associated with Container_A_1 and Container_B_0 (e.g., mapping the FQDNs of these containers 101 to the IP address 2.3.4.5).

In such a situation, a DNS "CNAME" record 303 associated with Container_D_0 may not need to be updated. Thus, in examples where a relatively large quantity of containers 101 are mounted to other containers 101, records associated with the mounted containers 101 need not be altered in situations where hardware resources implementing such containers 101 are moved. Forgoing altering such records may result in reduced expenditure of processing resources, time, and/or other resources that would be used to modify such records.

Figure 7:
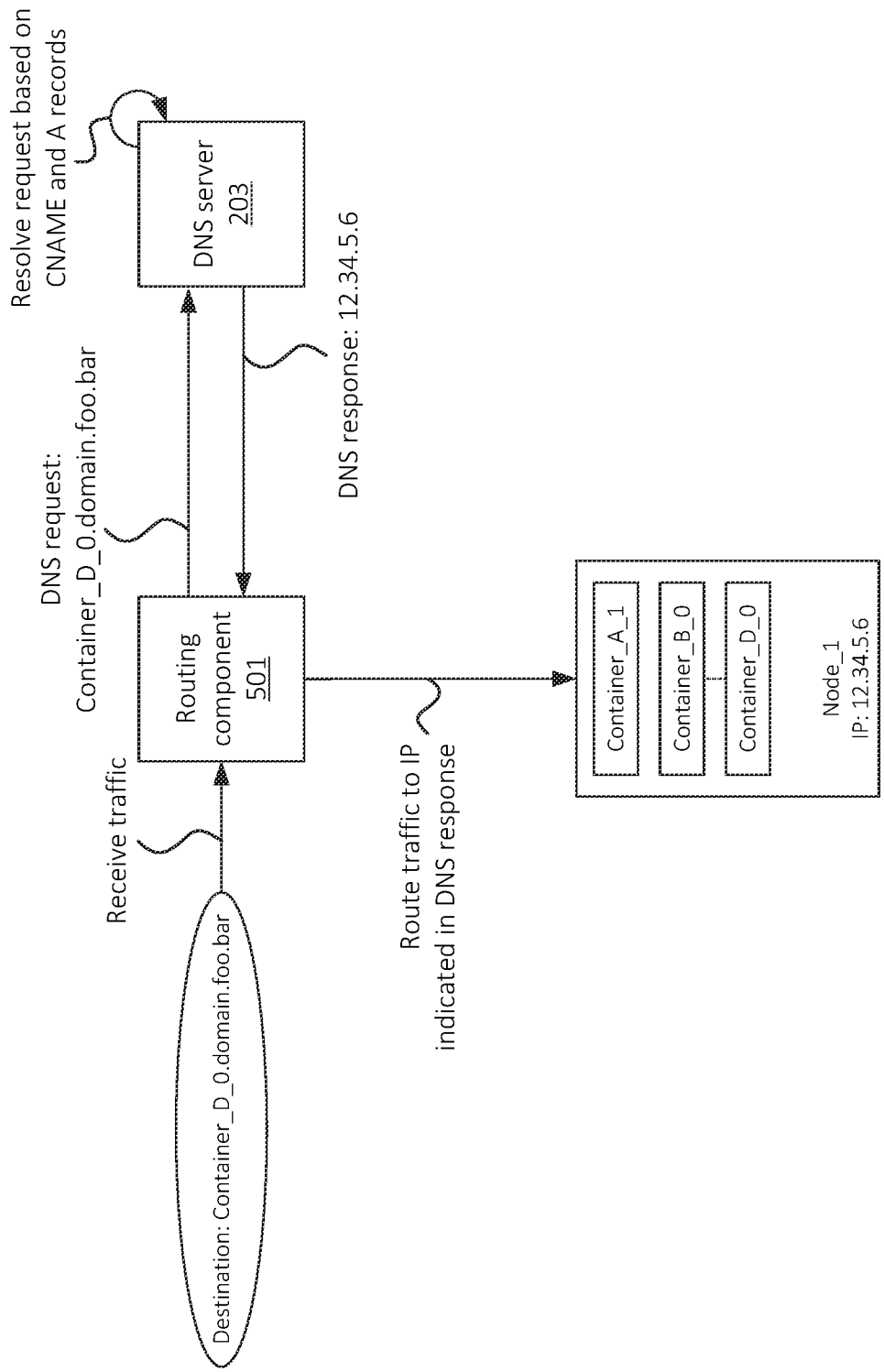

Thus, as shown in FIG. 7, after Node_1 has been moved to the new set of hardware resources with the IP address 12.34.5.6, traffic indicating Container_D_0) may continue to be appropriately routed to Node_1. For example, based on the updated DNS "A" records 601, as well as the previous (e.g., unmodified) DNS "CNAME" records 303, DNS server 203 may resolve the FQDN Container_D_0.domain.foo.bar to the new IP address 12.34.5.6, and routing component 501 may accordingly route the traffic to the new IP address.

Figure 8:
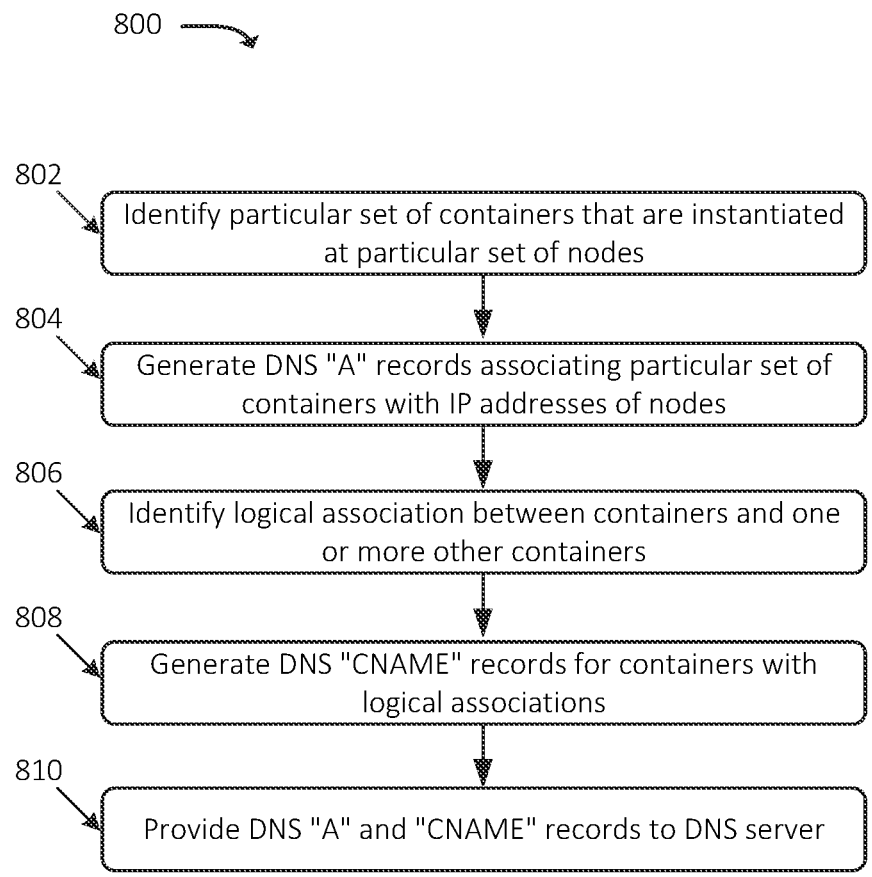
FIG. 8 illustrates an example process for translating records associated with the virtualized environment to one or more DNS records based on which traffic may be routed to containers of the virtualized environment, in accordance with some embodiments.

FIG. 8 illustrates an example process 800 for translating records associated with the virtualized environment to one or more DNS records based on which traffic may be routed to containers of the virtualized environment. In some embodiments, some or all of process 800 may be performed by Orchestration system 105. In some embodiments, one or more other devices may perform some or all of process 800 in concert with, and/or in lieu of, Orchestration system 105.

As shown, process 800 may include identifying (at 802) a particular set of containers that are instantiated at a particular set of nodes. For example, as discussed above, Orchestration system 105 may identify custom resource definition 107 and/or some other suitable data structure associated with a virtualized environment, indicating that a set of containers 101 are instantiated at a particular set of nodes 103. In some embodiments, Orchestration system 105 may identify containers 101 of a particular type, category, label, etc. that are instantiated at a particular set of nodes 103. For example, Orchestration system 105 may identify containers 101 that are designated as SDN controllers, ODL instances, etc. As another example, the virtualized environment may include a hierarchical arrangement of containers 101, and Orchestration system 105 may identify particular containers 101 that are at a highest level of the hierarchy, and/or at a higher level of the hierarchy than other containers 101. For example, Orchestration system 105 may identify containers 101 that are associated with "child" or "subordinate" containers 101, or for which child" or "subordinate" containers 101 may be assigned at a later time.

Process 800 may further include generating (at 804) a set of DNS "A" records, associating the identified (at 802) set of containers 101 with respective addresses (e.g., IP addresses) of nodes 103 on which such containers 101 are instantiated. For example, as discussed above, Orchestration system 105 may perform a translation of portions of one or more custom resource definitions 107, which indicate IP addresses and identifiers (e.g., names, FQDNs, etc.) of nodes 103 on which containers 101 are instantiated, to one or more DNS "A" records 201, which associate the identifiers (e.g., names, FQDNs, etc.) of such containers 101 to the IP addresses of respective nodes 103.

Process 800 may additionally include identifying (at 806) a logical association between the containers 101 (identified at 802) and one or more other containers 101. For example, Orchestration system 105 may identify custom resource definitions 301 and/or other suitable information indicating that one or more containers 101 have been mounted to and/or otherwise associated with containers 101 that were identified (at 802) as being instantiated at nodes 103. For example, the container(s) 101 identified (at 806) may include instances of one or more VNFs, while the container(s) 101 previously identified (at 802) may include instances of one or more SDN controllers that control such VNFs. In some embodiments, such association may indicate that particular VNFs (or other suitable types of containers 101) are instantiated on the same node 103 as the SDN controllers with which the VNFs are logically associated. For example, in situations where a failover, migration, etc. is performed, all containers 101 with logical associations (e.g., an SDN controller, as well as all VNFs with which the SDN controller is logically associated) would be moved from one node 103 (e.g., associated with a first IP address) to another node 103 (e.g., associated with a second IP address).

Process 800 may also include generating (at 808) DNS "CNAME" records for the particular containers 101 that are logically associated with other containers 101. For example, for containers 101 that are "child" or "subordinate" containers 101 with respect to other containers 101 (e.g., where a container 101 implementing a particular VNF may be a "child" or "subordinate" of a container 101 implementing an SDN controller), Orchestration system 105 may identify one or more custom resource definitions 301 or other suitable data structures indicating such association, and may extract relevant information for the DNS "CNAME" records. For example, Orchestration system 105 may identify the name, FQDN, etc. of the "child" or "subordinate" container 101 from custom resource definition 301 associated with the "child" or "subordinate" container 101. Orchestration system 105 may also identify the name, FQDN, etc. of the container 101 with which the "child" or "subordinate"

container 101 is mounted or otherwise associated. Orchestration system 105 may generate DNS "CNAME" record 303, indicating that the name, FQDN, etc. of the "child" or "subordinate" container 101 is an alias of the name, FQDN, etc. of the container 101 to which the "child" or "subordinate" container 101 is mounted.

Process 800 may further include providing (at 810) the DNS "A" and "CNAME" records to DNS server 203. For example, Orchestration system 105 may provide DNS "A" records 201 and DNS "CNAME" records 303 to DNS server 203, which may use such information when routing traffic to the "child" or "subordinate" container 101. For example, particular traffic may include the name, FQDN, etc. of the "child" or "subordinate" container 101, and DNS server 203 may resolve such name, FQDN, etc. to an IP address of the node 103 on which the "child" or "subordinate" container 101 is instantiated.

Figure 9:
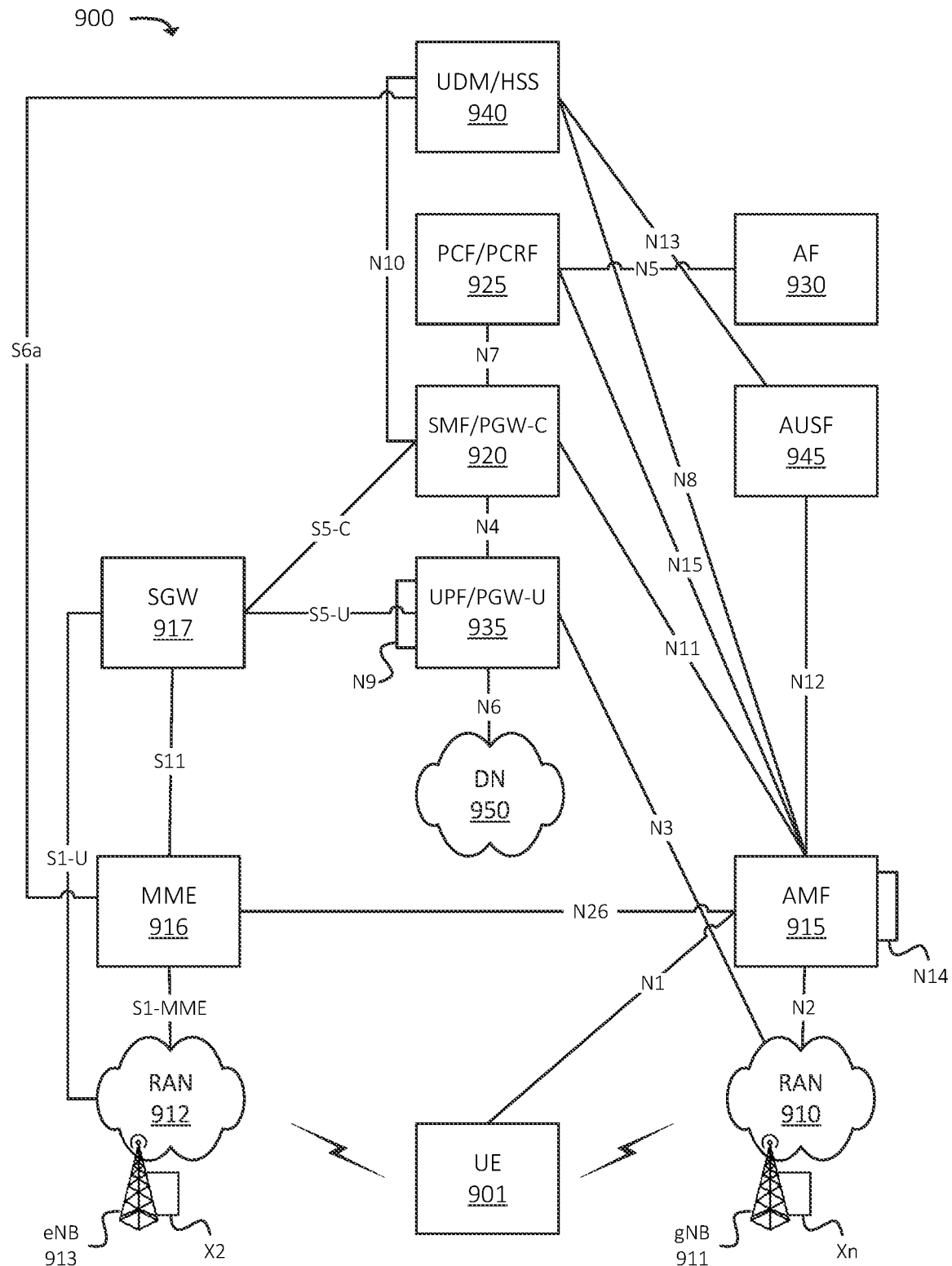
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5 G") network, and/or may include elements of a 5 G network. In some embodiments, environment 900 may correspond to a 5 G Non-Standalone ("NSA") architecture, in which a 5 G radio access technology ("RAT") may be used in conjunction with one or more other RATs (e.g., a Long-Term Evolution ("LTE") RAT), and/or in which elements of a 5 G core network may be implemented by, may be communicatively coupled with, and/or may include elements of another type of core network (e.g., an evolved packet core ("EPC")). In some embodiments, portions of environment 900 may represent or may include a 5 G core ("5GC"). As shown, environment 900 may include UE 901, RAN 910 (which may include one or more Next Generation Node Bs ("gNBs") 911), RAN 912 (which may include one or more evolved Node Bs ("eNBs") 913), and various network functions such as AMF 915, Mobility Management Entity ("MME") 916, Serving Gateway ("SGW") 917, SMF/Packet Data Network ("PDN") Gateway ("PGW")-Control plane function ("PGW-C") 920, Policy Control Function ("PCF")/Policy Charging and Rules Function ("PCRF") 925, Application Function ("AF") 930, UPF/PGW-User plane function ("PGW-U") 935, UDM/Home Subscriber Server ("HSS") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950).

The example shown in FIG. 9 illustrates one instance of each network component or function (e.g., one instance of SMF/PGW-C 920, PCF/PCRF 925, UPF/PGW-U 935, UDM/HSS 940, and/or AUSF 945). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF/PGW-C 920, PCF/PCRF 925, UPF/PGW-U 935, UDM/HSS 940, and/or AUSF 945, while another slice may include a second instance of SMF/PGW-C 920, PCF/PCRF 925, UPF/PGW-U 935, UDM/HSS 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as one or more routing components 501 (e.g., routers, modems, gateways, switches, hubs, etc.). Further, environment 900 may include and/or may be communicatively coupled to one or more DNS servers 203 that provide resolution of FQDNs, URLs, etc. (e.g., as described above). Further, some or all of environment 900 may be implemented as a containerized environment, in which one or more elements of environment 900 may be implemented by one or more containers 101, which may include VNF instances and/or controllers that control such VNF instances.

Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 901 may include a computation and communication device, such as a wireless mobile communication device that is capable of communicating with RAN 910, RAN 912, and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 901 may send traffic to and/or receive traffic (e.g., user plane traffic) from DN 950 via RAN 910, RAN 912, and/or UPF/PGW-U 935.

RAN 910 may be, or may include, a 5 G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface.

RAN 912 may be, or may include, a LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 912 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 912 may receive traffic intended for UE 901 (e.g., from UPF/PGW-U 935, SGW 917, and/or one or more other devices or networks) and may communicate the traffic to UE 901 via the air interface.

AMF 915 may include one or more devices, systems, VNFs, Cloud-Native Network Functions ("CNFs"), etc., that perform operations to register UE 901 with the 5 G network, to establish bearer channels associated with a session with UE 901, to hand off UE 901 from the 5 G network to another network, to hand off UE 901 from the other network to the 5 G network, manage mobility of UE 901 between RANs 910 and/or gNBs 911, and/or to perform other operations. In some embodiments, the 5 G network may include multiple AMFs 915, which communicate with each other via the N14 interface (denoted in FIG. 9 by the line marked "N14" originating and terminating at AMF 915).

MME 916 may include one or more devices, systems, VNFs, CNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 901. In some embodiments, the establishment of communications sessions may be performed in accordance with one or more policies provided by PCF/PCRF 925.

PCF/PCRF 925 may include one or more devices, systems, VNFs, CNFs, etc., that aggregate information to and from the 5 G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward UE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

UDM/HSS 940 and AUSF 945 may include one or more devices, systems, VNFs, CNFs, etc., that manage, update, and/or store, in one or more memory devices associated with AUSF 945 and/or UDM/HSS 940, profile information associated with a subscriber. AUSF 945 and/or UDM/HSS 940 may perform authentication, authorization, and/or accounting operations associated with the subscriber and/or a communication session with UE 901.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

Figure 10:
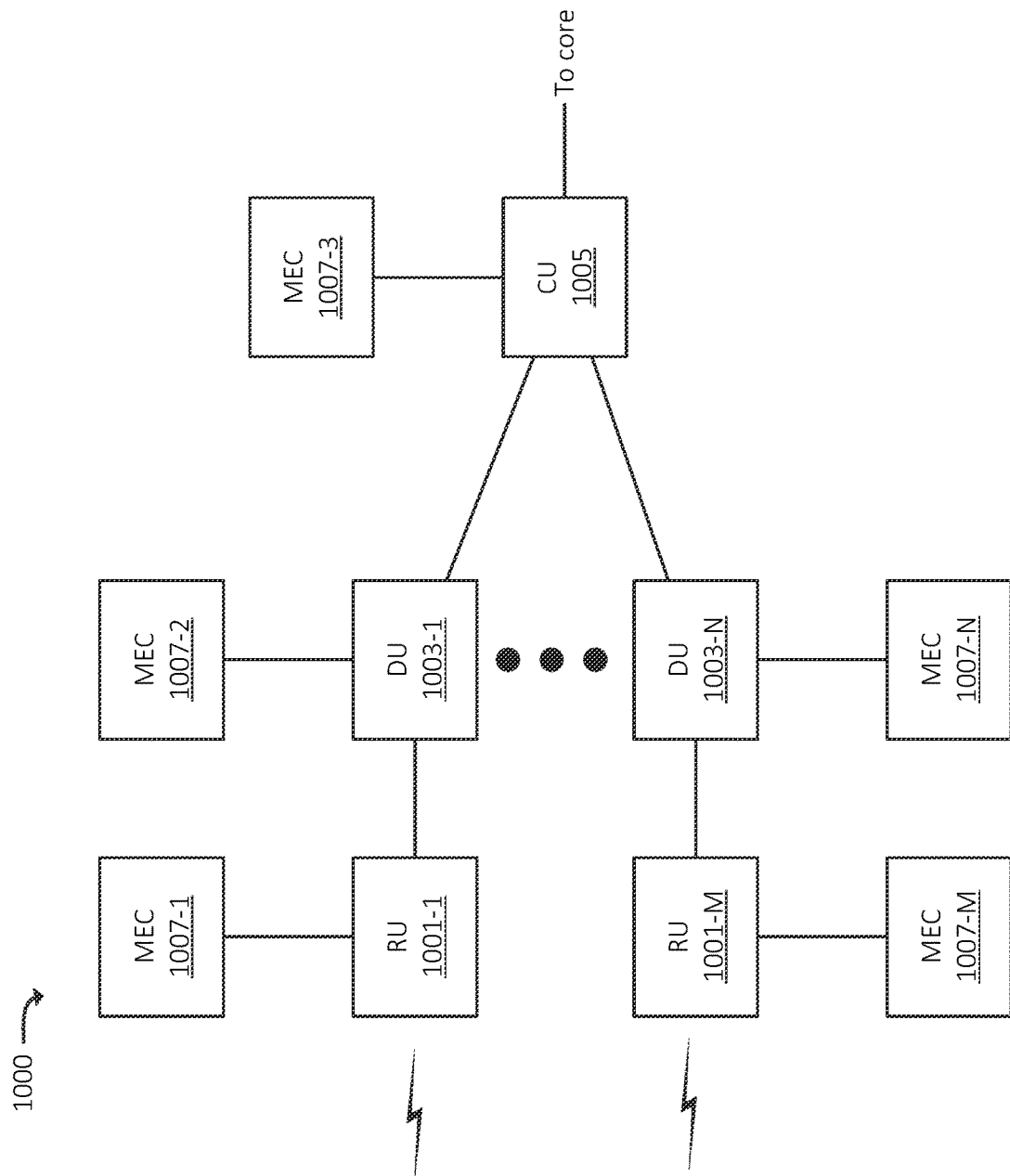
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5 G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/ aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 901, via a respective RU 1001.

For example, RU 1001-1 may route some traffic, from UE 901, to MEC 1007-1 instead of to a core network (e.g., via DU 1003 and CU 1005). MEC 1007-1 may process the traffic, perform one or more computations based on the received traffic, and may provide traffic to UE 901 via RU 1001-1. In this manner, ultra-low latency services may be provided to UE 901, as traffic does not need to traverse DU 1003, CU 1005, and an intervening backhaul network between DU network 1000 and the core network. In some embodiments, MEC 1007 may include, and/or may implement, some or all of the functionality described above with respect to Orchestration system 105, DNS server 203, routing component 501, UPF 935, and/or one or more other devices, systems, VNFs, CNFs, etc.

Figure 11:
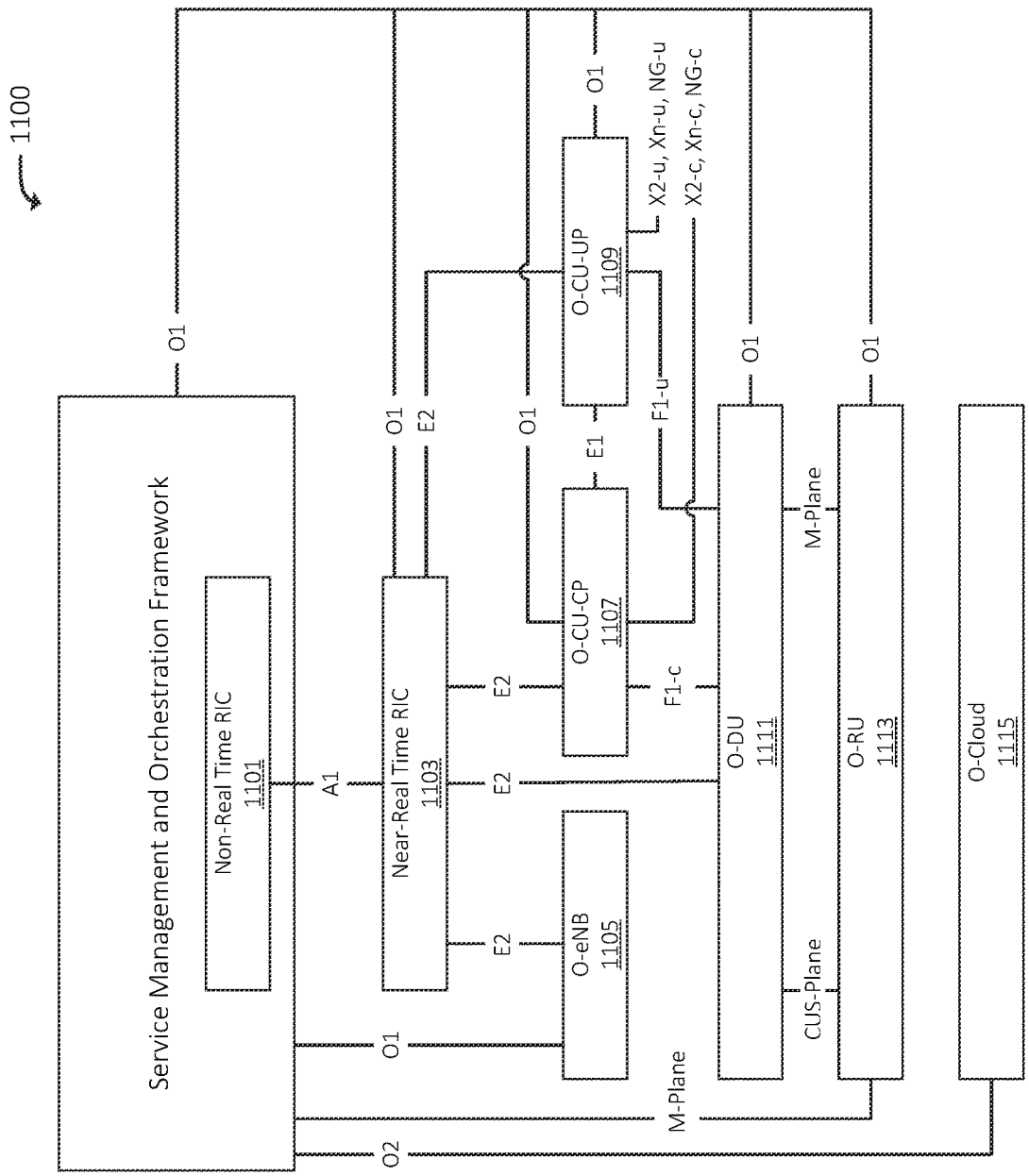
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components. In some embodiments, O-RAN environment 1100 may be, or may be implemented by, a virtualized environment (e.g., some or all of the elements of O-RAN environment 1100 may be implemented by one or more containers 101 instantiated at one or more nodes 103).

In some embodiments, some or all of the elements of O-RAN environment 1100 may be implemented by one or more configurable or provisionable resources, such as virtual machines, cloud computing systems, physical servers, and/or other types of configurable or provisionable resources.

In some embodiments, some or all of O-RAN environment 1100 may be implemented by, and/or communicatively coupled to, one or more MECs 1007. In some embodiments, one or more elements of O-RAN environment 1100 may be mounted to one or more other elements of O-RAN environment 1100. For example, O-eNB 1105 may be mounted to Non-Real Time RIC 1101 and/or Near-Real Time RIC 1103, O-DU 1111 may be mounted to Near-real Time RIC 1103, and so on.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time RIC 1103 may receive performance information, via one or more E2 interfaces, from O-eNB 1105, O-CU-CP 1107, and/or O-CU-UP 1109, and may modify parameters associated with O-eNB 1105, O-CU-CP 1107, and/or O-CU-UP 1109 based on such performance information. Similarly, Non-Real Time RIC 1101 may receive performance information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 1uu and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 1007, which may provide services, and may be communicatively coupled, to O-CU-CP 1107, O-CU-UP 1109, O-DU 1111, and/or O-RU 1113 (e.g., via an O1 and/or O2 interface).

Figure 12:
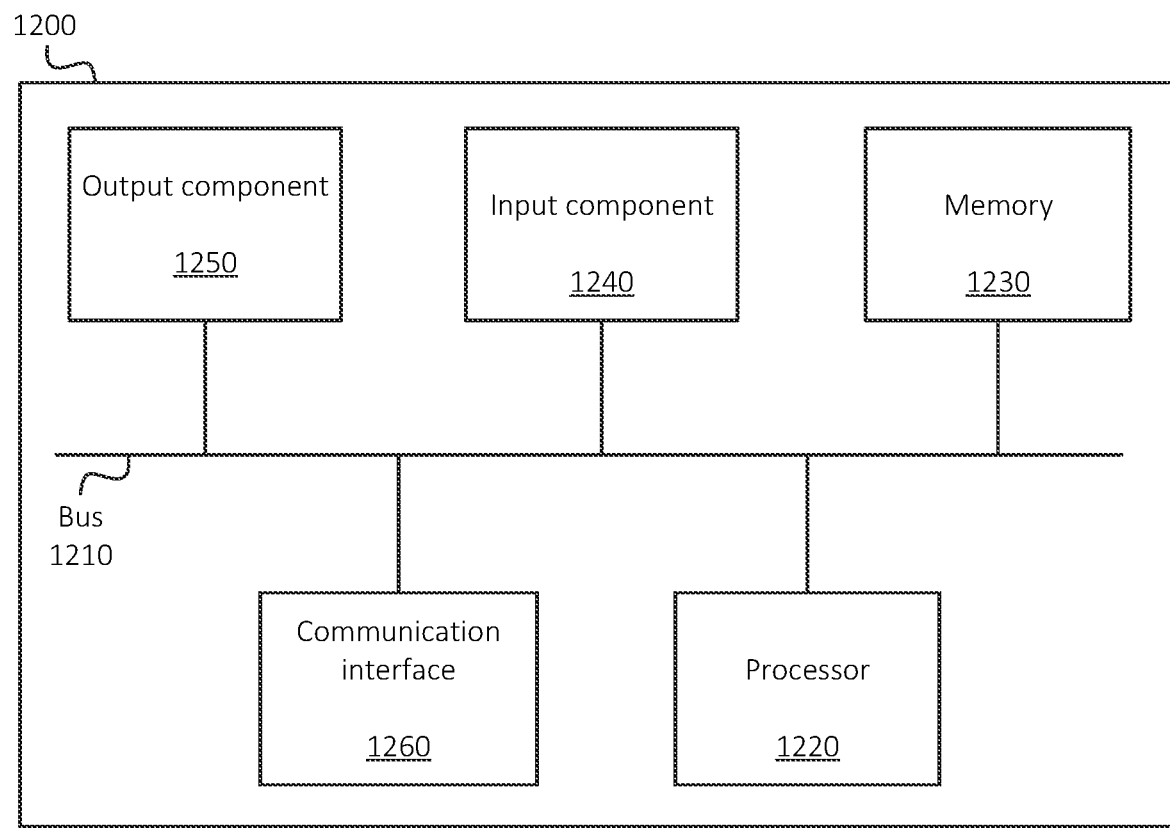
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:

identify a custom resource definition of a virtualized environment, wherein the custom resource definition includes configuration parameters associated with the virtualized environment;

identify, based on the configuration parameters included in the custom resource definition, that a first container and a second container of a virtualized environment are instantiated at a particular node that is associated with a particular address;

identify, further based on the configuration parameters included in the custom resource definition, a logical association between the first and second containers;

generate a first Domain Name System ("DNS") record associating the first container with the address of the particular node;

generate, based on identifying the logical association between the first and second containers as indicated by the configuration parameters included in the custom resource definition, a second DNS record associating the second container with the first container, wherein the second DNS record includes an identifier of the first container and an identifier of the second container; and provide the first and second DNS records to a DNS server, wherein the DNS server uses the first and second DNS records to provide the address of the particular node when receiving a DNS request that includes the identifier of the second container.

2. The device of claim 1, wherein the first DNS record includes a DNS A record.

3. The device of claim 1, wherein the second DNS record includes a DNS CNAME record.

4. The device of claim 3, wherein the second DNS record indicates that the identifier of the second container is an alias of the identifier of the first container.

5. The device of claim 1, wherein identifying the logical association between the first and second containers includes identifying, in a particular record of the custom resource definition associated with the virtualized environment, an indication that the second container is associated with the first container in a hierarchical manner.

6. The device of claim 5, wherein the indication that the second container is associated with the first container in the hierarchical manner includes an indication that the second container is mounted to the first container.

7. The device of claim 1, wherein the first container implements a software-defined network ("SDN") controller, and wherein the second container implements a Virtualized Network Function ("VNF") that is controlled by the SDN controller.

8. A non-transitory computer-readable medium, storing a plurality of processor-executable instructions to:

identify a custom resource definition of a virtualized environment, wherein the custom resource definition includes configuration parameters associated with the virtualized environment;

identify, based on the configuration parameters included in the custom resource definition, that a first container and a second container of a virtualized environment are instantiated at a particular node that is associated with a particular address;

identify, further based on the configuration parameters included in the custom resource definition, a logical association between the first and second containers;

generate a first Domain Name System ("DNS") record associating the first container with the address of the particular node;

generate, based on identifying the logical association between the first and second containers as indicated by the configuration parameters included in the custom resource definition, a second DNS record associating the second container with the first container, wherein the second DNS record includes an identifier of the first container and an identifier of the second container; and provide the first and second DNS records to a DNS server, wherein the DNS server uses the first and second DNS records to provide the address of the particular node when receiving a DNS request that includes the identifier of the second container.

9. The non-transitory computer-readable medium of claim 8, wherein the first DNS record includes a DNS A record.

10. The non-transitory computer-readable medium of claim 8, wherein the second DNS record includes a DNS CNAME record.

11. The non-transitory computer-readable medium of claim 10, wherein the second DNS record indicates that the identifier of the second container is an alias of the identifier of the first container.

12. The non-transitory computer-readable medium of claim 8, wherein identifying the logical association between the first and second containers includes identifying, in a particular record of the custom resource definition associated with the virtualized environment, an indication that the second container is associated with the first container in a hierarchical manner.

13. The non-transitory computer-readable medium of claim 12, wherein the indication that the second container is associated with the first container in the hierarchical manner includes an indication that the second container is mounted to the first container.

14. The non-transitory computer-readable medium of claim 8, wherein the first container implements a software-defined network ("SDN") controller, and wherein the second container implements a Virtualized Network Function ("VNF") that is controlled by the SDN controller.

15. A method, comprising:

identifying a custom resource definition of a virtualized environment, wherein the custom resource definition includes configuration parameters associated with the virtualized environment;

identifying, based on the configuration parameters included in the custom resource definition, that a first container and a second container of a virtualized environment are instantiated at a particular node that is associated with a particular address;

identifying, further based on the configuration parameters included in the custom resource definition, a logical association between the first and second containers;

generating a first Domain Name System ("DNS") record associating the first container with the address of the particular node;

generating, based on identifying the logical association between the first and second containers, a second DNS record associating the second container with the first container, wherein the second DNS record includes an identifier of the first container and an identifier of the second container; and providing the first and second DNS records to a DNS server, wherein the DNS server uses the first and second DNS records to provide the address of the particular node when receiving a DNS request that includes the identifier of the second container.

16. The method of claim 15, wherein the first DNS record includes a DNS A record, and wherein the second DNS record includes a DNS CNAME record.

17. The method of claim 16, wherein the second DNS record indicates that the identifier of the second container is an alias of the identifier of the first container.

18. The method of claim 15, wherein identifying the logical association between the first and second containers includes identifying, in a particular record of the custom resource definition associated with the virtualized environment, an indication that the second container is associated with the first container in a hierarchical manner.

19. The method of claim 18, wherein the indication that the second container is associated with the first container in the hierarchical manner includes an indication that the second container is mounted to the first container.

20. The method of claim 15, wherein the first container implements a software-defined network ("SDN") controller, and wherein the second container implements a Virtualized Network Function ("VNF") that is controlled by the SDN controller.

\* \* \* \* \*